US012139134B2

(12) United States Patent
Jiang et al.

(10) Patent No.: US 12,139,134 B2
(45) Date of Patent: Nov. 12, 2024

(54) CONTROL AND PLANNING WITH LOCALIZATION UNCERTAINTY

(71) Applicant: Baidu USA LLC, Sunnyvale, CA (US)

(72) Inventors: Shu Jiang, Sunnyvale, CA (US); Weiman Lin, Sunnyvale, CA (US); Yu Cao, Sunnyvale, CA (US); Yu Wang, Sunnyvale, CA (US); Qi Luo, Sunnyvale, CA (US); Jiangtao Hu, San Jose, CA (US); Jinghao Miao, San Mateo, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 217 days.

(21) Appl. No.: 17/446,652

(22) Filed: Sep. 1, 2021

(65) Prior Publication Data

US 2023/0065284 A1 Mar. 2, 2023

(51) Int. Cl.
*B60W 30/09* (2012.01)
*B60W 30/095* (2012.01)
*B60W 60/00* (2020.01)

(52) U.S. Cl.
CPC ........ *B60W 30/09* (2013.01); *B60W 30/0956* (2013.01); *B60W 60/0015* (2020.02);
(Continued)

(58) Field of Classification Search
CPC ............. B60W 30/09; B60W 30/0956; B60W 60/0015; B60W 2420/42; B60W 2420/52; B60W 2554/80
See application file for complete search history.

(56) References Cited

U.S. PATENT DOCUMENTS

2017/0217433 A1\* 8/2017 Halder ................... G05D 1/027
2018/0348771 A1\* 12/2018 Chu ................... B60W 30/0956
(Continued)

FOREIGN PATENT DOCUMENTS

CN          113298044 A  *  8/2021  ......... G06K 9/00805
WO   WO-2018098161 A1  *  5/2018  ........ B60W 30/0956

OTHER PUBLICATIONS

Raj Haresh Patel et al., "Impact of Localization Errors on Automated Vehicle Control Strategies", 2017 IEEE Vehicular Networking Conference (VNC) at Torino, Italy, Nov. 2017, 10 pp. total.
(Continued)

*Primary Examiner* — Jelani A Smith
*Assistant Examiner* — Nada Mahyoob Alqaderi
(74) *Attorney, Agent, or Firm* — WOMBLE BOND DICKINSON (US) LLP

(57) ABSTRACT

Systems, methods, and media for factoring localization uncertainty of an ADV into its planning and control process to increase the safety of the ADV. The uncertainty of the localization can be caused by sensor inaccuracy, map matching algorithm inaccuracy, and/or speed uncertainty. The localization uncertainty can have negative impact on trajectory planning and vehicle control. Embodiments described herein are intended to increase the safety of the ADV by considering localization uncertainty in trajectory planning and vehicle control. An exemplary method includes determining a confidence region for an ADV that is automatically driving on a road segment based on localization uncertainty and speed uncertainty; determining that an object is within the confidence region, and a probability of collision with the ADV based on a distance of the object to the ADV; and planning a trajectory based on the probability of collision, and controlling the ADV based on the probability of collision.

20 Claims, 9 Drawing Sheets

(52) U.S. Cl.
CPC . *B60W 2420/403* (2013.01); *B60W 2420/408* (2024.01); *B60W 2554/80* (2020.02)

(56) References Cited

U.S. PATENT DOCUMENTS

| | | | |
|---|---|---|---|
| 2019/0094865 A1* | 3/2019 | Fletcher | G01C 21/26 |
| 2019/0095727 A1* | 3/2019 | Adireddy | G02B 26/10 |
| 2019/0196481 A1* | 6/2019 | Tay | G05D 1/0246 |
| 2019/0217857 A1* | 7/2019 | Sorin | B60W 60/0023 |
| 2019/0302768 A1* | 10/2019 | Zhang | G05D 1/0088 |
| 2019/0359205 A1* | 11/2019 | Xu | G05D 1/0238 |
| 2020/0041994 A1* | 2/2020 | Alalao | G05D 1/0022 |
| 2020/0410702 A1* | 12/2020 | Zhang | G01C 21/32 |
| 2021/0157325 A1* | 5/2021 | Beller | B60W 60/001 |
| 2021/0409897 A1* | 12/2021 | Liu | G01S 13/89 |

OTHER PUBLICATIONS

Kelvin Wong et al., "Estimating Autonomous Vehicle Localization Error Using 2D Geographic Information", ISPRS International Journal of Geo—Information, vol. 8, 2019, 23 pp. total.
Kecheng Xu et al., "Data Driven Prediction Architecture for Autonomous Driving and its Application on Apollo Platform", arXiv:2006.06715v1, Jun. 11, 2020, 8 pp. total.

* cited by examiner

CONTROL AND PLANNING WITH LOCALIZATION UNCERTAINTY

TECHNICAL FIELD

Embodiments of the present disclosure relate generally to operating autonomous vehicles. More particularly, embodiments of the disclosure relate to determining noises in localization and using the noises in trajectory planning and vehicle control.

BACKGROUND

An autonomous driving vehicle (ADV), when driving in an automatic mode, can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV needs to generate planned trajectories and control the vehicle to move along the planned trajectories. The planning and control of the ADV rely on its states, such as location, speed, acceleration and heading angle, which can be derived from a localization module based on sensors mounted on the vehicle.

However, the sensors associated with the localization module may suffer from uncertainty and noise due to hardware limitations. These uncertainties and noise may lead to localization uncertainty, which can cause safety issues in automatic driving.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
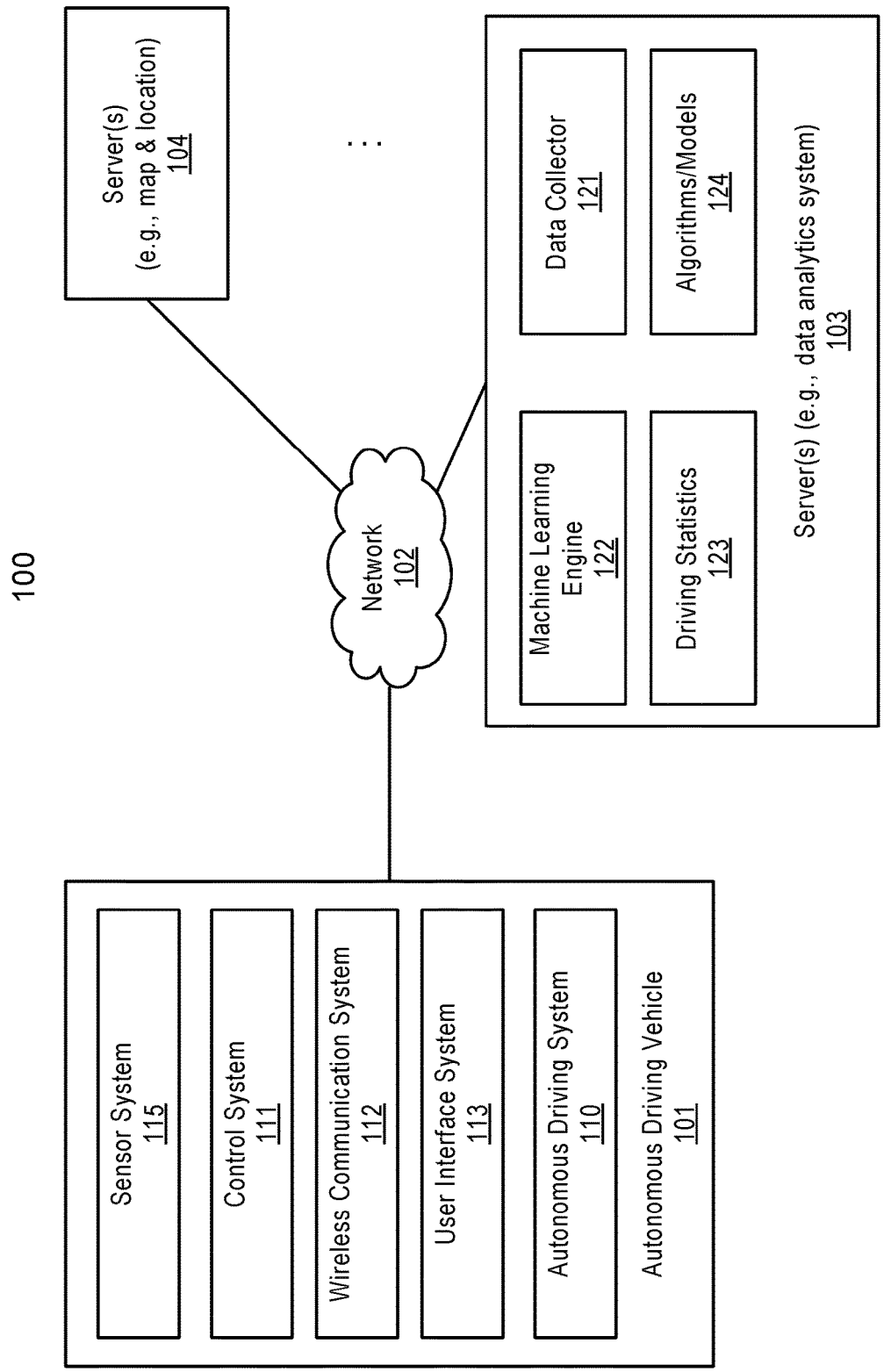
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, systems, methods, and media for factoring localization uncertainty of an ADV into its planning and control process to increase the safety of the ADV. The uncertainty of the localization can be caused by sensor inaccuracy, map matching algorithm inaccuracy, and/or speed uncertainty. The localization uncertainty can have negative impact on trajectory planning and vehicle control. Embodiments described herein are intended to increase the safety of the ADV by considering localization uncertainty in trajectory planning and vehicle control.

An exemplary method can include the operations of determining a confidence region for an ADV that is automatically driving on a road segment based on localization uncertainty and speed uncertainty; determining that an object is within the confidence region, and a probability of collision with the ADV based on a distance of the object to the ADV; and planning a trajectory based on the probability of collision, and controlling the ADV based on the probability of collision.

In on embodiment, the confidence region can be a circular area with the ADV at a center of the circle area or at another location when the ADV is moving such that the speed uncertainty has an impact on the size of the confidence region.

In one embodiment, a radius of the confidence region is a sum of a localization uncertainty radius, and a multiplication product of a speed uncertainty radius, a speed uncertainty ratio, and a planning updating ratio. Each of the localization uncertainty radius, the speed uncertainty radius, and the speed uncertainty ratio can be determined based on specifications of one or more sensors mounted on the ADV for localization. The planning updating ratio is a time interval for generating a planned trajectory.

In one embodiment, each point in the confidence region has an uncertainty probability that measures likelihood that the ADV is at that point. The uncertainty probability is determined based on a distance of the point to the ADV.

In one embodiment, the planning of the trajectory based on the probability further includes generating a planned trajectory that avoid colliding between the ADV and the object. The controlling of the ADV based on the probability further includes adjust one or more control commands to avoid collision between the ADV and the object, or reduce the probability of collision between the ADV and the object.

The embodiments described above are not exhaustive of all aspects of the present invention. It is contemplated that the invention includes all embodiments that can be practiced from all suitable combinations of the various embodiments summarized above, and also those disclosed below.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
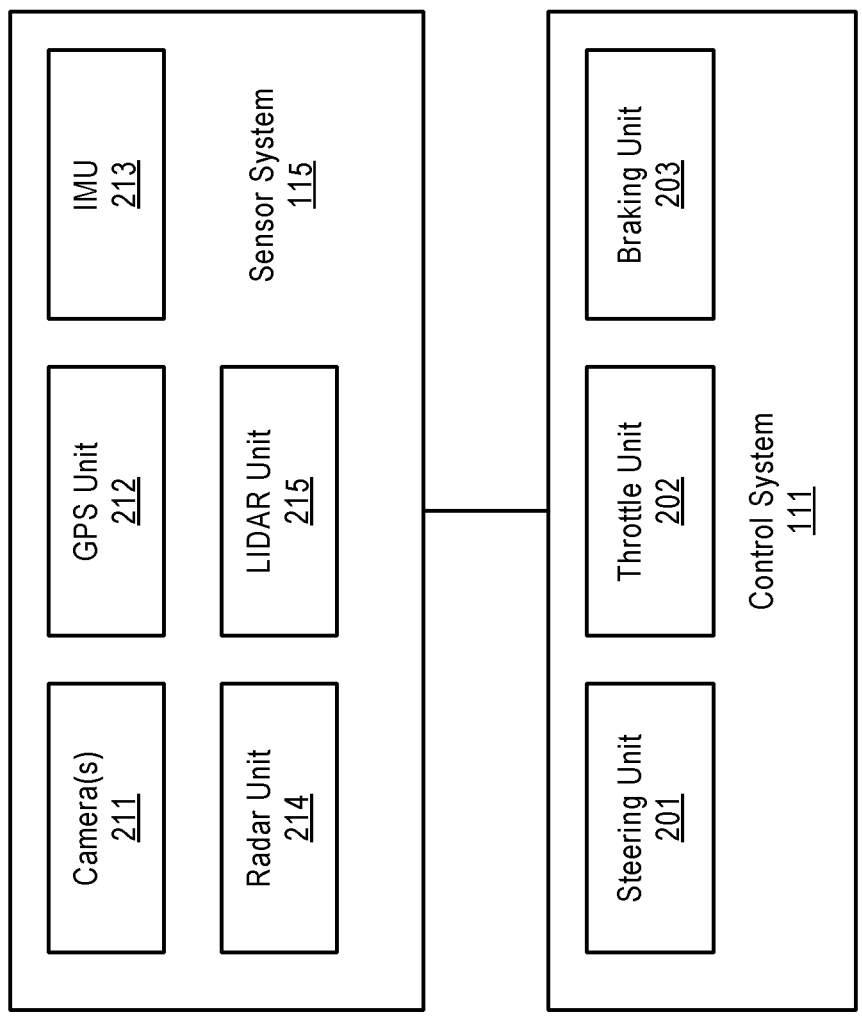
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
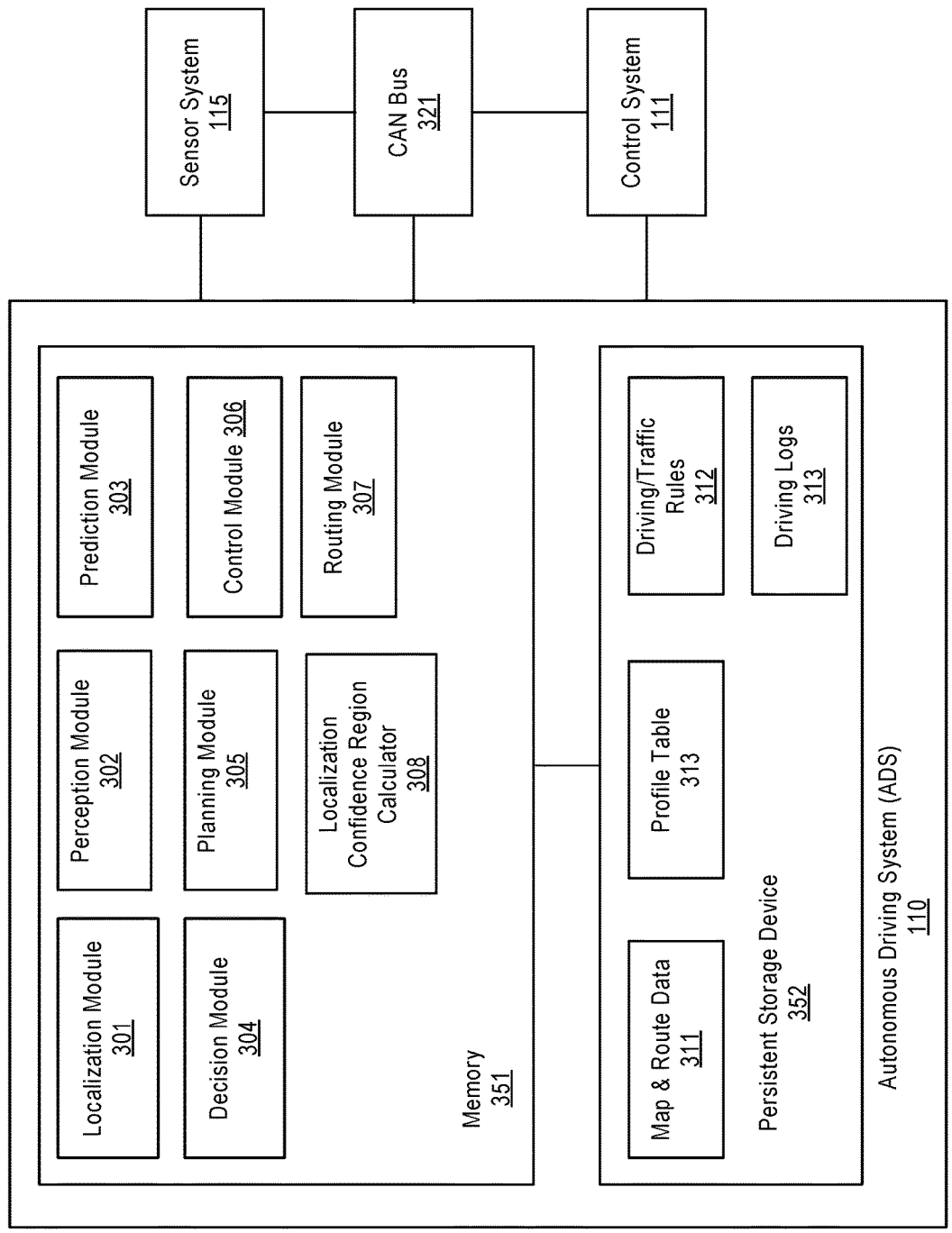
FIGS. 3A-3B are block diagrams illustrating an example of a perception and planning system used with an autonomous vehicle according to one embodiment.
Figure 3B:
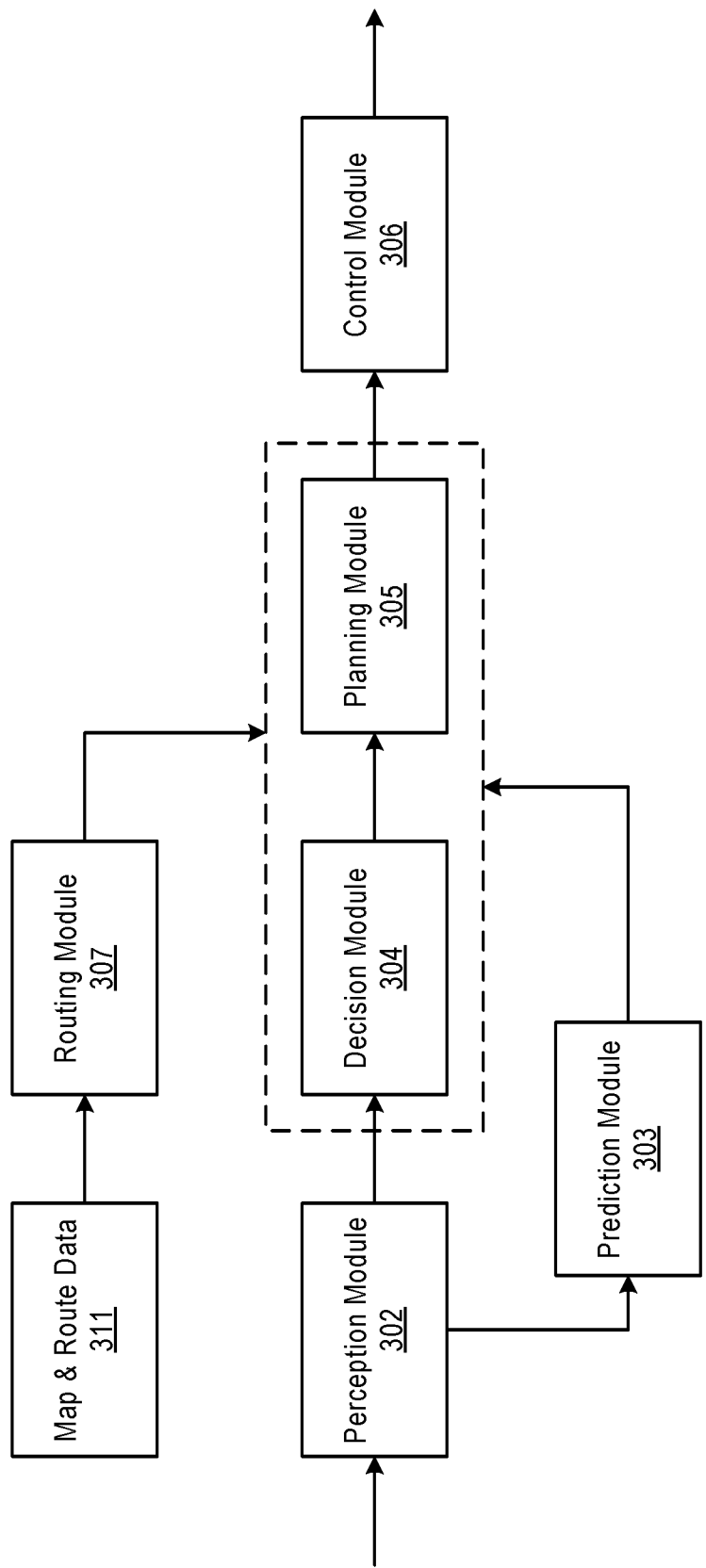

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307. routing module 307, and localization confidence region calculator 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV 101.

Localization confidence region calculator 308 can be used to determine a confidence region (i.e., an uncertainty area) for the ADV. The ADV has a probability (0<a<1.0) of being somewhere within the region, although the specific position of the ADV within the confidence region is uncertain. The size of the confidence region and/or shape of the confidence region is based on a vehicle speed and sensor accuracy. The probability can be used by planning module 305 and control module 306 to plan trajectories and control the ADV.

Localization Confidence Region

Figure 4:
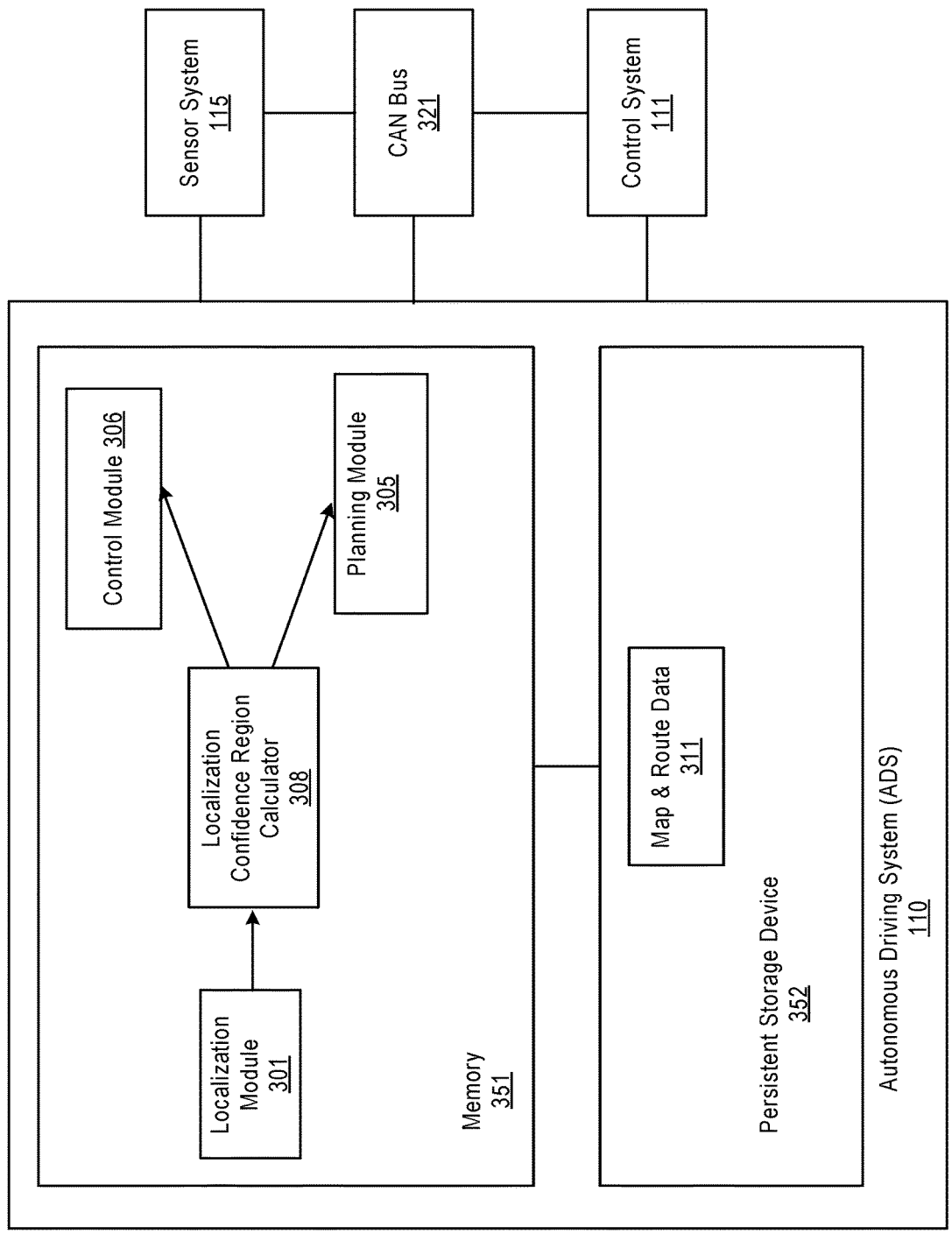
FIG. 4 illustrates a system for using localization uncertainty in trajectory planning and vehicle control according to one embodiment.

FIG. 4 illustrates a system for using localization uncertainty in trajectory planning and vehicle control according to one embodiment.

As shown in the figure, the localization confidence region calculator 308 is provided in the ADS 110 to determine a confidence region for the ADV 101 that hosts the ADS 110. The confidence region can be used by the planning module 308 in planning trajectories, and by the controlling module in controlling the ADV 101 to follow the planned trajectories.

The localization confidence region calculator 308 is a software module that calculates a region that the ADV 101 is likely to be located for each planning cycle (e.g., 100 ms), and also referred to as a frame in the disclosure).

In one embodiment, the confidence region can be a circular area that is determined based on errors associated with the localizing process. The localization module 301 can establish a position of the ADV 101 at any particular moment using sensors and/or maps.

For example, LIDAR sensors can be used to measure distances to nearby objects, creating a local map of the vicinity of the ADV 101. This local map can then be used to register against a prebuilt map to obtain a position of the ADV using a map matching algorithm. Thus, both the LIDAR sensors and the map matching algorithm can be a source of localization errors. High quality LIDAR sensors and better map matching algorithms can reduce localization errors. With a large amount of empirical evidence, these errors can be quantified.

Thus, for any particular set of sensors mounted on the ADV and a particular map matching algorithm used in the localization process, a margin of errors for the localization module 301 can be determined. The margin of errors can be used to determine the size of the confidence region.

In one embodiment, for each planning cycle, the localization module 301 generates a position for the ADV for that planning cycle, and also generates a confidence region around the position of the ADV. For that planning cycle, the ADV can be anywhere in the confidence region. The closer a position is to the current position of the ADV for that planning cycle, the more probable that the ADV will be at the position, and vice versa. Thus, the localization confidence region calculator 308 can also calculate a probability for each point within the confidence region.

When generating a planned trajectory for the planning cycle, the planning module 301 can take the confidence region into consideration. For example, if an obstacle is within the confidence region and the position occupied by the obstacle has a probability of 50%, which indicates the ADV 101 itself has a 50% chance to be at this position, then the ADV 101 has a 50% chance of colliding with the obstacle.

The planning module 301 can consider this probability of collision in trajectory planning. In one embodiment, the planning module can generate a trajectory for the ADV 101 to follow to completely avoid the obstacle. One way to do this to make sure that the obstacle is out of the confidence region of the ADV 101 for any particular moment. When the obstacle is outside the confidence region, the probability of collision between the ADV 101 and the obstacle is reduced to 0. In another embodiment, rather than completely avoiding collision with the obstacle, the planning module 301 can generate a planned trajectory that reduces the probability of collision. This type of implementations can be deployed to vehicles that travels in places where no human lives would be endangered.

Similarly, the control module 306, when controlling the ADV 101 to follow the planned trajectory, can consider the probability of collision. For example, if strictly following the planned strategy may cause the ADV 101 to collide with the obstacle with the confidence region, the control module 306 may adjust the controlling commands (e.g., throttle, brake, steering control commands) to deviate from the planned trajectory so as not to take the chance of colliding with the obstacle.

Figure 5:
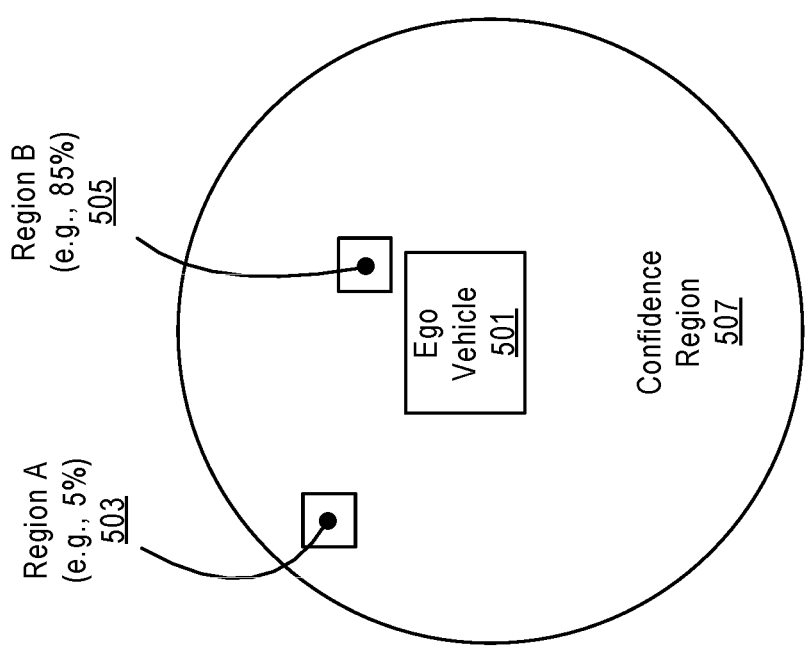
FIG. 5 illustrates a confidence region according one embodiment.

FIG. 5 illustrates a confidence region 507 according one embodiment. More specifically, the confidence region 507 is generated by an ego vehicle 501 that is not moving or moving very slowly. Thus, the ego vehicle 501 is approximately located at the center of the confidence region 507.

The confidence region 507 is also called uncertainty area of the ego vehicle 501. The current position of the ego vehicle 501 is a theoretical position, which means the ego vehicle 501 would be at that location if the hardware sensors and the associated map matching algorithm worked perfectly. However, in reality, due to a margin of errors, the ego vehicle 501 can be anywhere within the confidence region although it specific location is uncertain within the confidence region.

In one embodiment, a radius of the circular confidence region 507 can be calculated using the formula: r_u+v_u*dt, where r_u is an uncertainty radius, v_u is a speed uncertainty radius, and dt is a planning updated ratio (e.g., ~0.1 s). Each of the uncertainty radius and the speed uncertainty radius can be determined based on sensor specifications and/or empirical evidence.

The confidence region 507 can be divided into many different smaller regions, with each region associated with a different probability, which is a function of the region's distance to the current position (i.e., theoretical position) of the ADV 101. Any point within a smaller region can have the same probability.

For example, any point in region A 503 has a probability of 5%, which means the ego vehicle 501 has a 5% probability to be in region A 503, while the ADV has an 85% probability to be in region B 505, because region A 503 is further away from the current position of the ADV 501 that region B 505.

Figure 6:
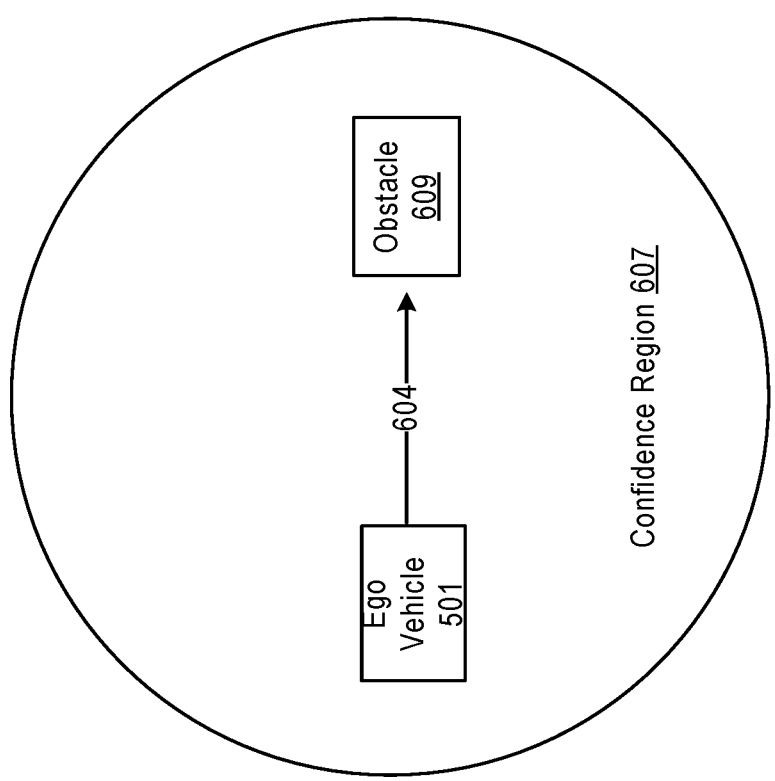
FIG. 6 illustrates a confidence region according to another embodiment.

FIG. 6 illustrates a confidence region 607 according to another embodiment. More particularly, the confidence region 607 is calculated with speed uncertainty being considered.

In FIG. 6, the ego vehicle 501 is moving towards the direction pointed by the arrow 604. The speed of the ego vehicle 501 creates additional localization uncertainty, which would have negative impact on the planning functions and the prediction functions of the ego vehicle.

As shown in FIG. 5, the ego vehicle 501 is not at the center of the circular confidence region 607, since there is additional uncertainty caused by the moving speed of the ego vehicle 501.

In one embodiment, when the uncertainty caused by the moving speed of the ego vehicle 501 is considered, the radius of the circular confidence region 607 can be calculated using the formula: r_u+(v*v_u_ratio)*dt, where r_u is an uncertainty radius, v_u is a speed uncertainty radius, v is a moving speed, v_u_ratio is an uncertainty ratio (e.g. 5%), and dt is a planning updated ratio (e.g., ~0.1 s).

Figure 7:
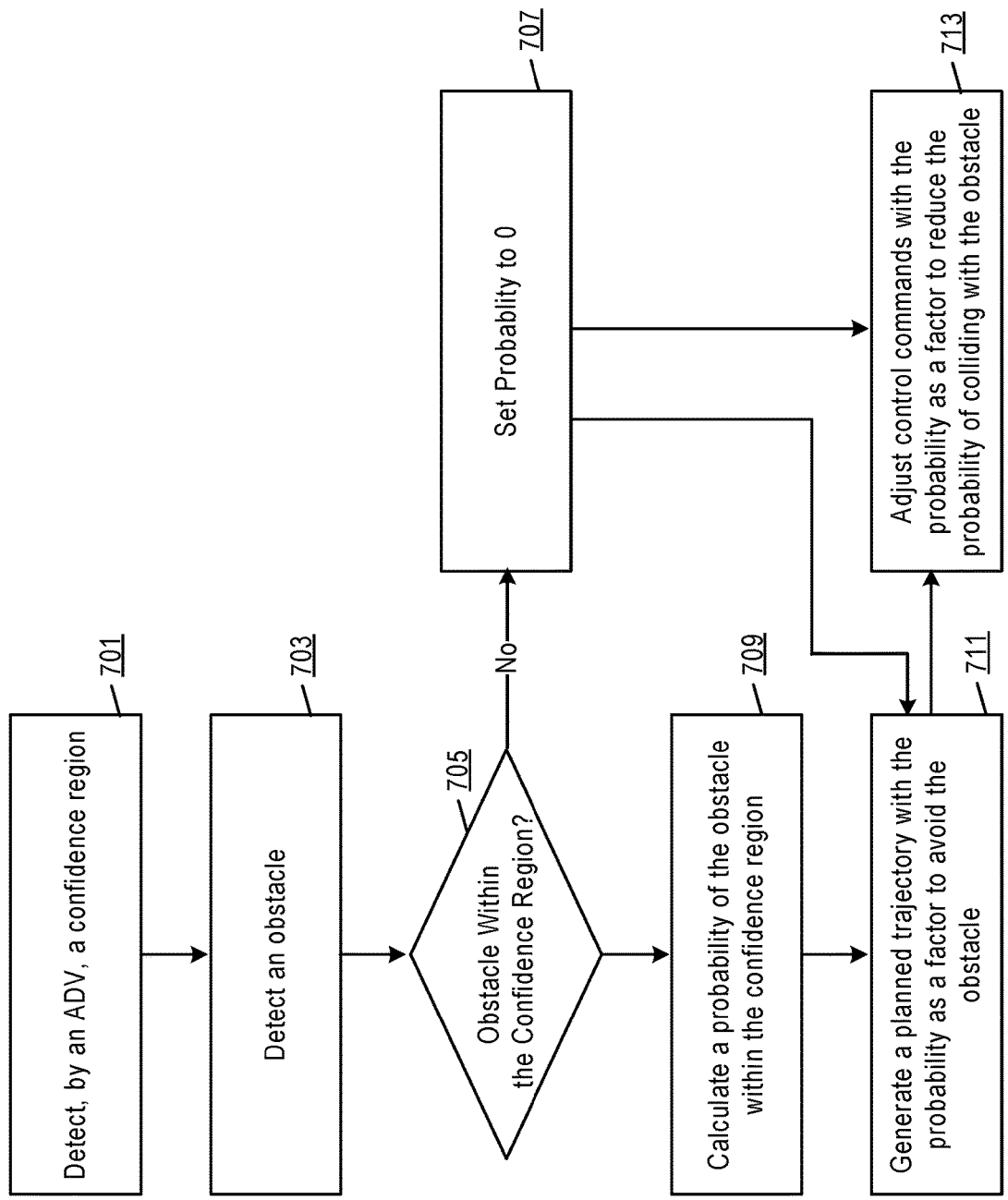
FIG. 7 is a flow chart illustrating a process of using location uncertainty in the planning and controlling functions of an ADV according to one embodiment.

FIG. 7 is a flow chart illustrating a process of using location uncertainty in the planning and controlling functions of an ADV according to one embodiment. The process may be performed by a processing logic which may include software, hardware, or a combination thereof. For example, the process may be performed by the localization confidence region calculator 308, the localization module 301, and the control module 305, and the control module 306 described in FIG. 4.

In operation 701, the processing logic determines a confidence region during a particular planning cycle based on a set of parameters derived from a large amount of empirical data associated with sensor specifications and/or the map matching algorithm. The set of parameters represent a margin of errors of a localization module of the ADV.

For example, the set of parameters can include an uncertainty radius, a speed uncertainty radius, and an uncertainty ratio. These parameters, in combination with the current speed of the ADV and a planning updated ratio (i.e., the duration of the planning cycle) can be used to determine the size of the confidence region, which can be a circular area.

In operation 703, the processing logic detects an obstacle, which can be a moving vehicle, a walking pedestrian, or a static object.

In operation 705, the processing logic determines whether the obstacle is within the confidence region of the ADV. If it is outside the confidence region, the processing logic determines there is a 0 probability for the ADV to collide with the obstacle at that particular moment (i.e., during the planning cycle) in operation 707.

In operation 709, if the obstacle is within the confidence region, the processing logic calculates a probability based on a distance between the obstacle and the current position of the ADV. The current position can be a position that the ADV would be at if the localization module works perfectly.

In operation 711, the processing logic generates a planned trajectory with the probability of collision as a factor such that the ADV can avoid colliding with the obstacle or reduce the probability of colliding with the obstacle.

In operation 713, the processing logic issues control commands based on the probability. If strictly following the planned trajectory may have a probability of colliding with the obstacle, the processing logic can adjust the control commands to deviate from the planned trajectory to reduce the probability of collision.

Figure 8:
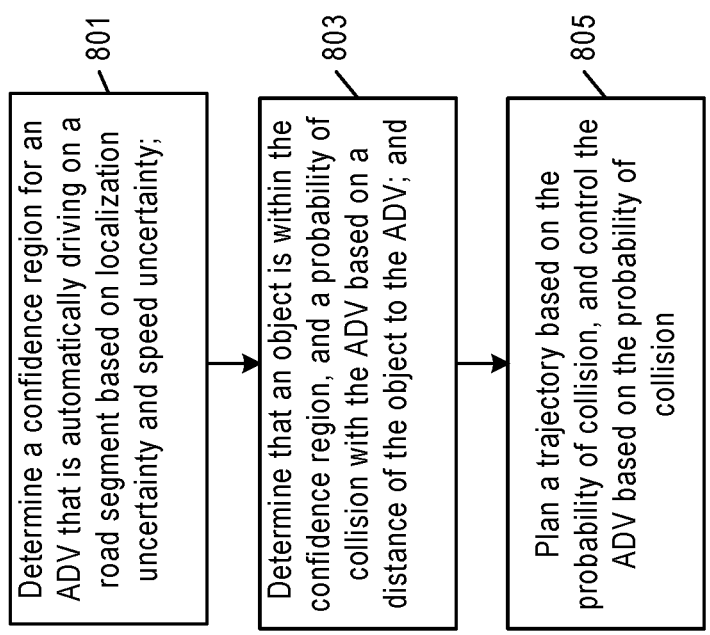
FIG. 8 is a flow chart illustrating a process of operating an autonomous driving vehicle according to one embodiment.

FIG. 8 is a flow chart illustrating a process of operating an autonomous driving vehicle (ADV) according to one embodiment. For example, the process may be performed by the localization confidence region calculator 308, the localization module 301, and the control module 305, and the control module 306 described in FIG. 4.

As shown in FIG. 8, in operation 801, the processing logic determines a confidence region for an ADV that is automatically driving on a road segment based on localization uncertainty and speed uncertainty. In operation 803, the processing logic determines an object is within the confidence region, and a probability of collision with the ADV based on a distance of the object to the ADV. In operation 805, the processing logic plans a trajectory based on the probability of collision, and controls the ADV based on the probability of collision.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
    determining, during a planning cycle, a confidence region for an ADV that is automatically driving on a road segment, the confidence region determined based on localization uncertainty and speed uncertainty and the confidence region including a plurality of points with each respective point in the plurality of points associated with an uncertainty probability indicating a likelihood the ADV is located at the respective point of the plurality of points, wherein a size of the confidence region is determined based on a duration of the planning cycle;
    determining that an object is within the confidence region, and a probability of collision with the ADV based on a distance of the object to the ADV;
    planning a trajectory based on the probability of collision; and
    controlling the ADV according to the trajectory to avoid collision.

2. The method of claim 1, wherein the confidence region is a circle with the ADV at a center of the circle.

3. The method of claim 2, wherein a radius of the confidence region is a sum of a first element and a second element, wherein the first element is a localization uncertainty radius, and wherein the second element is a product of a speed uncertainty radius, a speed uncertainty ratio, and a planning updating ratio.

4. The method of claim 3, wherein each of the localization uncertainty radius, the speed uncertainty radius, and the speed uncertainty ratio is determined based on specifications of one or more sensors mounted on the ADV for localization, and wherein the planning updating ratio is a time interval for generating a planned trajectory.

5. The method of claim 3, wherein the uncertainty probability for each respective point in the plurality of points is determined based on a distance of the respective point to the ADV.

6. The method of claim 1, wherein the controlling of the ADV based on the probability further includes adjust one or more control commands to avoid collision between the ADV and the object, or reduce the probability of collision between the ADV and the object.

7. A non-transitory machine-readable medium having instructions stored therein, which
    when executed by a processor, cause the processor to perform operations of operating an autonomous driving vehicle (ADV), the operations comprising:
        determining, during a planning cycle, a confidence region for an ADV that is automatically driving on a road segment, the confidence region determined based on localization uncertainty and speed uncertainty and the confidence region including a plurality of points with each respective point in the plurality of points associated with an uncertainty probability indicating a likelihood the ADV is located at the respective point of the plurality of points, wherein a size of the confidence region is determined based on a duration of the planning cycle;

determining that an object is within the confidence region, and a probability of collision with the ADV based on a distance of the object to the ADV;

planning a trajectory based on the probability of collision; and controlling the ADV according to the trajectory to avoid collision.

8. The non-transitory machine-readable medium of claim 7, wherein the confidence region is a circle with the ADV at a center of the circle.

9. The non-transitory machine-readable medium of claim 8, wherein a radius of the confidence region is a sum of a first element and a second element, wherein the first element is a localization uncertainty radius, and wherein the second element is a product of a speed uncertainty radius, a speed uncertainty ratio, and a planning updating ratio.

10. The non-transitory machine-readable medium of claim 9, wherein each of the localization uncertainty radius, the speed uncertainty radius, and the speed uncertainty ratio is determined based on specifications of one or more sensors mounted on the ADV for localization, and wherein the planning updating ratio is a time interval for generating a next planned trajectory.

11. The non-transitory machine-readable medium of claim 9, wherein the uncertainty probability for each respective point in the plurality of points is determined based on a distance of the respective point to the ADV.

12. The non-transitory machine-readable medium of claim 7, wherein the controlling of the ADV based on the probability further includes adjust one or more control commands to avoid collision between the ADV and the object, or reduce the probability of collision between the ADV and the object.

13. A data processing system, comprising:

a processor; and a memory coupled to the processor to store instructions, which when executed by the processor, cause the processor to perform operations of operating an autonomous driving vehicle (ADV), the operations comprising:

determining, during a planning cycle, a confidence region for an ADV that is automatically driving on a road segment, the confidence region determined based on localization uncertainty and speed uncertainty and the confidence region including a plurality of points with each respective point in the plurality of points associated with an uncertainty probability indicating a likelihood the ADV is located at the respective point of the plurality of points, wherein a size of the confidence region is determined based on a duration of the planning cycle, determining that an object is within the confidence region, and a probability of collision with the ADV based on a distance of the object to the ADV, planning a trajectory based on the probability of collision, and controlling the ADV according to the trajectory to avoid collision.

14. The data processing system of claim 13, wherein the confidence region is a circle with the ADV at a center of the circle.

15. The data processing system of claim 14, wherein a radius of the confidence region is a sum of a first element and a second element, wherein the first element is a localization uncertainty radius, and wherein the second element is a product of a speed uncertainty radius, a speed uncertainty ratio, and a planning updating ratio.

16. The data processing system of claim 15, wherein each of the localization uncertainty radius, the speed uncertainty radius, and the speed uncertainty ratio is determined based on specifications of one or more sensors mounted on the ADV for localization, and wherein the planning updating ratio is a time interval for generating a planned trajectory.

17. The data processing system of claim 15, wherein the uncertainty probability for each respective point in the plurality of points is determined based on a distance of the respective point to the ADV.

18. The method of claim 1, wherein uncertainty of a localization is caused by one or more sensor inaccuracy, map matching algorithm inaccuracy, and the speed uncertainty.

19. The non-transitory machine-readable medium of claim 7, wherein uncertainty of a localization is caused by one or more sensor inaccuracy, map matching algorithm inaccuracy, and the speed uncertainty.

20. The data processing system of claim 13, wherein uncertainty of a localization is caused by one or more sensor inaccuracy, map matching algorithm inaccuracy, and the speed uncertainty.

* * * * *